(No Model.)
J. D. GRISWOLD.
SUSPENSION DEVICE FOR LAMPS AND OTHER ARTICLES.
No. 350,673. Patented Oct. 12, 1886.
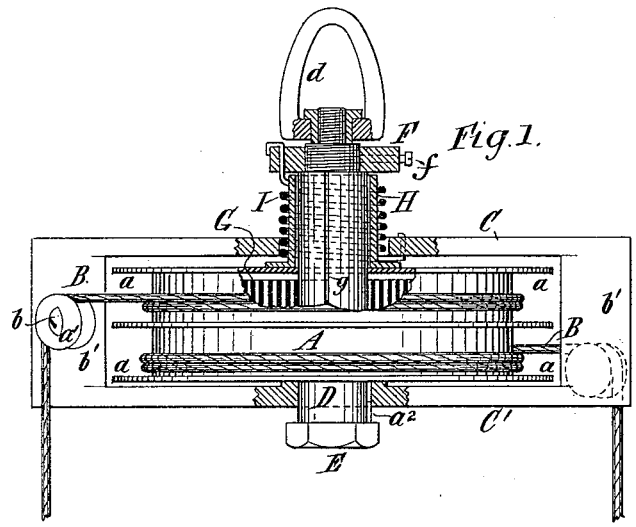
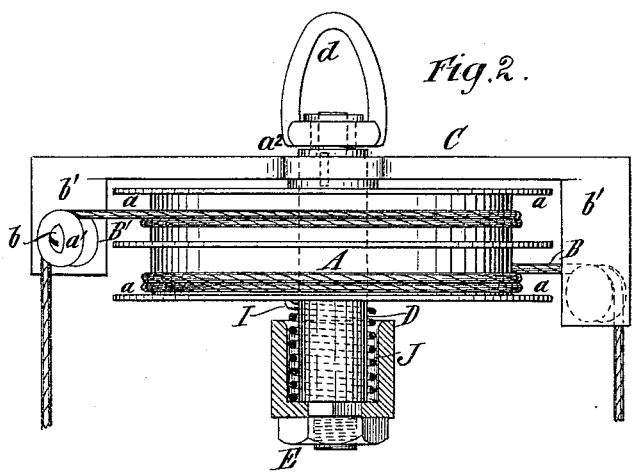
Witnesses
Jas. R. Bowen
Geo. Wadman
Inventor
J. D. Griswold
by his attys,
Gifford & Brown

UNITED STATES PATENT OFFICE.

JAMES D. GRISWOLD, OF BROOKLYN, NEW YORK.

SUSPENSION DEVICE FOR LAMPS AND OTHER ARTICLES.

SPECIFICATION forming part of Letters Patent No. 350,673, dated October 12, 1886.

Application filed November 6, 1885. Serial No. 181,998. (No model.)

*To all whom it may concern:*

Be it known that I, JAMES D. GRISWOLD, of Brooklyn, in the State of New York, have invented a certain new and useful Improvement in Suspension Devices for Lamps or other Articles, of which the following is a specification.

I will describe in detail a suspension device embodying my improvement, and then point out the novel features in claims.

In the accompanying drawings, Figure 1 is a vertical section of a suspension device embodying my improvement, and Fig. 2 is a view, partly in section, of a suspension device of modified form.

Similar letters of reference designate corresponding parts in both figures.

In the example of my improvement shown in Fig. 1, A designates a hollow cylindrical drum of any desired metal. It is provided with circumferential flanges $a$. Between the flanges cords or chains B are wound upon the drum. After leaving the drum said cords or chains pass over guides $a'$, (here shown as pulleys,) mounted upon pins or studs $b$, upon upright portions $b'$ of a frame, C C' $b'$. The portions C C' of the frame constitute upper and lower plates or cross-bars thereof. The frame is a rigid structure, and is preferably made of metal. The drum A is mounted upon an arbor, D. It may turn freely about said arbor. The arbor D is preferably prevented from turning by a feather or spline, $a^2$. The lower end of the arbor is screw-threaded, to receive a nut, E. The arbor D is long enough to extend for a considerable distance above the drum and the cross bar or plate C. It passes through a suitable aperture in said cross-bar or plate. Upon its upper end said arbor has rigidly secured to it a ring, F. The ring may be prevented from turning upon the arbor by a set-screw, $f$. Secured to the arbor D by a swiveling-connection is a loop, $d$, by which the device may be suspended.

Within the drum A is a counterbalancing-spring, G. This spring is convolute and engages at one end with the arbor D, and is secured at the other to the drum A. This spring is intended to counterbalance the weight of an article suspended from the cords or chains B in the well-known manner. As here shown, the end of this spring, which engages with the arbor, is preferably bent, so as to form a hook, which extends into a groove, $g$, in the arbor. By this means the spring may move up and down with the drum upon the arbor without becoming detached from the latter.

A sleeve, H, constituting a portion of the drum is rigidly secured upon the upper side of the drum and surrounds the arbor D. This sleeve is preferably of metal, and may be secured to the drum by solder or any other suitable means. It extends upwardly through the aforesaid aperture in the cross-bar or plate C of the frame, and nearly to the cap F. Of course it may turn freely with the drum about the arbor D.

I designates a brake for retarding the rotation of the drum in the direction to unwind the cords or chains. Said brake consists of a coil-spring arranged about the sleeve H, and rigidly secured at one end to the cross-bar or plate C of the frame, and at the other end to the cap F. It may be so secured in any suitable manner. As here shown, it is secured by bent portions of the ends of the spring passing through suitable holes in the cap F and the portion C of the frame. The brake-spring is, in effect, secured to the arbor D, near the upper end of the latter. As shown, the frame and the drum, with its appurtenances, are suspended from the brake-spring I.

When the weight of a lamp or other article is brought to bear upon the cords or chains, tending to draw the drum and frame downward, the spring I is extended, whereby its interior diameter is reduced and its coils caused to grip the sleeve H of the drum with greater or less force, dependent upon the weight suspended from the cords or chains. The action of the brake is therefore to retard the rotation of the drum and cause the lamp or other article suspended from the cords or chains to be maintained in any position to which it may be adjusted vertically. When the weight upon the cords or chains is relaxed, the brake-spring I moves the frame and drum downwardly, the spring relaxes its grip and the drum may then rotate freely to rewind the cords or chains.

If from any cause the spring-brake I should become broken or detached, the nut E will prevent the drum and frame from moving off from the arbor D.

In the example of my improvement shown in Fig. 2 the brake-spring I is a compression-spring. It is arranged below the drum and is rigidly secured at one end thereto by solder or otherwise. It surrounds the arbor D and is supported at one end thereby or by an appurtenance thereof. The sleeve H is, as here shown, omitted. The spring extends into a chamber, J, forming said appurtenance of the arbor D. It is unsecured at its lower end so that it may rotate freely with the drum. It, however, rests upon the bottom of the chamber J. The arbor D passes through a suitable aperture in the bottom of the chamber J, and is screw-threaded to receive a nut, E. The drum and frame in this example of my improvement are vertically movable. They are moved upwardly by means of the brake-spring I, but their downward movement is effected by the weight of the lamp or other article suspended from the cords or chains B. When the weight of a lamp or other article is brought to bear upon the cords or chains, the drum is moved downwardly, causing the spring-brake I to be compressed and the outer surface of its coils to bind upon the interior surface of the chamber J, thereby retarding the rotation of the drum in the direction to unwind the cords or chains. When the weight upon the cords or chains is relieved, the brake is relaxed and the drum may then rotate freely to rewind the cords or chains.

What I claim as my invention, and desire to secure by Letters Patent, is—

1. The combination, with an arbor, of a spring-drum mounted on said arbor, cords or chains wound upon the drum and passing over guides on a movable part of the machine to the article to be suspended, a coil-spring constituting a brake, supported at one end by a fixed portion of the machine and at the other by a movable part of the machine, and a part for receiving the action of the brake, said brake being varied in size diametrically when the cords or chains are pulled downwardly, so that it will bind upon said part for receiving its action, substantially as specified.

2. The combination, with an arbor, of a spring-drum mounted on said arbor, cords or chains wound upon the drum and passing over guides to the article to be suspended, a frame surrounding the drum upon which said guides are mounted, and a coil-spring constituting a brake secured at one end to the arbor, at the upper end of the latter, and at the other end to said frame, extending about said drum, or an extension thereof, and sustaining said drum and the frame, substantially as specified.

JAMES D. GRISWOLD.

Witnesses:
DANIEL H. DRISCOLL,
JAS. R. BOWEN.